(No Model.)

T. H. HENDERSHOT & E. H. ACKERMAN.
DRAFT EQUALIZER.

No. 497,981. Patented May 23, 1893.

Witnesses
C. J. Williamson.
H. L. Hough.

Inventors
Theodore H. Hendershot and
Elmer H. Ackerman,
by Franklin H. Hough,
their atty.

UNITED STATES PATENT OFFICE.

THEODORE H. HENDERSHOT AND ELMER H. ACKERMAN, OF GRISWOLD, IOWA.

DRAFT-EQUALIZER.

SPECIFICATION forming part of Letters Patent No. 497,981, dated May 23, 1893.

Application filed January 25, 1893. Serial No. 459,726. (No model.)

*To all whom it may concern:*

Be it known that we, THEODORE H. HENDERSHOT and ELMER H. ACKERMAN, citizens of the United States, residing at Griswold, in the county of Cass and State of Iowa, have invented certain new and useful Improvements in Draft-Equalizers; and we do declare the following to be a full, clear, and exact description of the invention, such as will enable others skilled in the art to which it appertains to make and use the same, reference being had to the accompanying drawings, and to the letters of reference marked thereon, which form a part of this specification.

The object of our invention is to provide an improved draft equalizer, and to this end the invention consists in the equalizer having the construction and combination of parts hereinafter specified and claimed.

The invention is clearly illustrated in the accompanying drawings, which with the letters of reference marked thereon form a part of this specification, like letters of reference indicating the same parts throughout the several views, and in which drawings—

Figure 1:
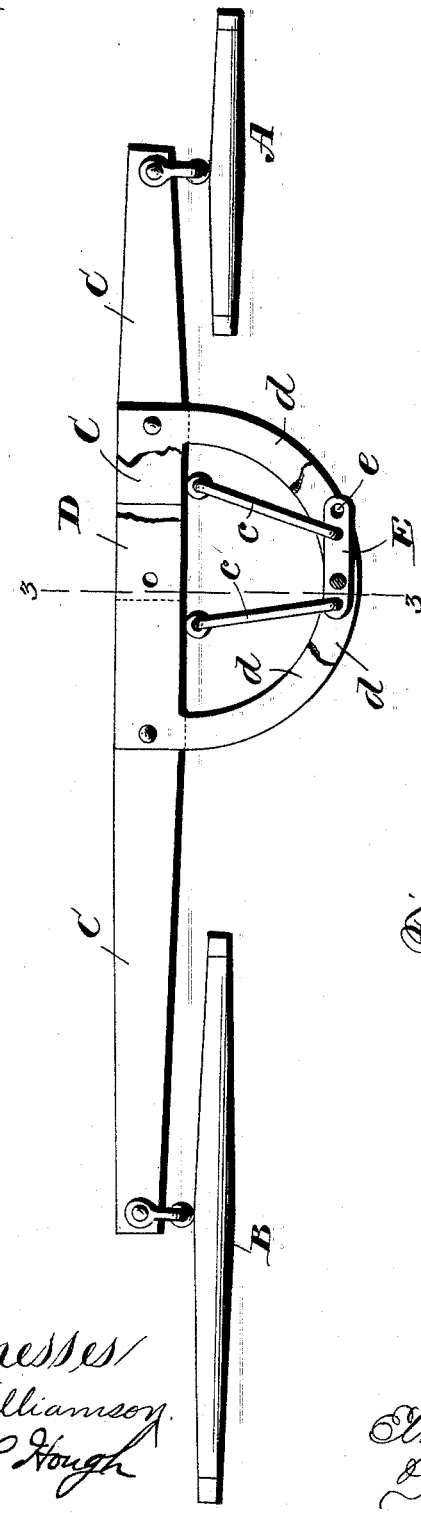
Figure 2:
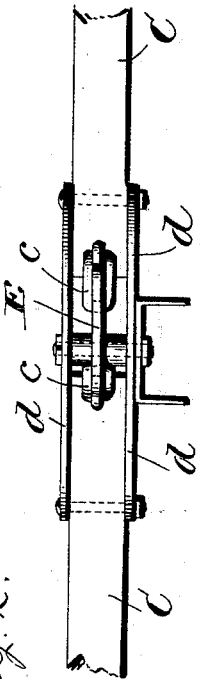
Figure 3:
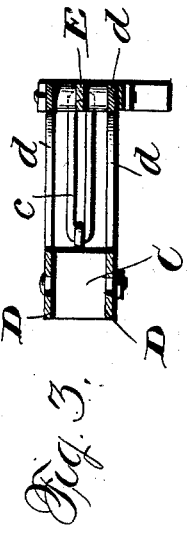

Figure 1 is a plan view of our invention, and, Fig. 2 is a detail front view of the same. Fig. 3 is a section on the line 3, 3, of Fig. 1.

The invention is shown in the accompanying drawings as a three horse equalizer.

A designates the singletree and B, the doubletree, each of which is attached to the outer longer end of a lever C that is pivoted between two bars D, D, placed one above and the other below the lever. The levers C under normal conditions extend in line with each other. They are of unequal length, that to which the singletree is attached, being the shorter, but they are of like power, as the point of pivoting each is such as to give their long and short arms the same ratio to each other. Each bar D has a semi-circular forward extension d, and pivoted to these at a point relatively midway between the pivots of the levers C, C, is a short lever E, the fulcrum or pivot of which is at such a point that it has a long and a short arm related to each other in power as the number of horses to be attached to one lever C, is to the number to be attached to the other lever. In the present instance the ratio is two to one; so that the long arm is capable of exerting twice the power of the shorter. The long arm is of course connected to the singletree lever C and the short arm to the doubletree lever C. The connection in each instance is by a link c and with the short arms of the levers C, C.

To adapt our evener for four horses, we provide the lever E with a hole e farther from the pivot of said lever than the one in which the link c is shown as placed. The link when placed in the hole e makes the effective power of the long arm of the lever E, as three to one. When four horses are to be used, besides shifting the link c to the hole e, it is simply necessary to substitute any three horse evener for the doubletree B. It will be seen that the semi-circular arms d form guards to prevent harness, &c., from becoming entangled with the evener mechanism.

Having thus described our invention, what we claim to be new, and desire to secure by Letters Patent, is—

The draft-equalizer described, consisting of the bars D with semi-circular forward extensions d, the levers C, C, pivoted independently of each other between said bars at different distances from the center thereof, a doubletree on one of said levers, a singletree on the other, the short lever E pivoted to one side of its longitudinal center between the semi-circular extensions d, and provided with hole e near the end of its longer arm, and the link c pivotally and detachably connected with said short lever and connecting the same with the lever C within the space inclosed by the semi-circular extensions, substantially as shown and described.

In testimony whereof we affix our signatures in presence of two witnesses.

THEODORE H. HENDERSHOT.
ELMER H. ACKERMAN.

Witnesses:
HENRY ACKERMAN,
J. C. BRYANT.